US012797879B2

(12) United States Patent
Daigler et al.

(10) Patent No.: US 12,797,879 B2
(45) Date of Patent: Nov. 17, 2026

(54) BOTTLE AND REFILL

(71) Applicant: Conopco, Inc., Englewood Cliffs, NJ (US)

(72) Inventors: Meegan Daigler, Portland, ME (US); Albert J. Kwak, Brooklyn, NY (US); Charles Simon Paradise, Brooklyn, NY (US)

(73) Assignee: Conopco, Inc., Hoboken, NJ (US)

( * ) Notice: Subject to any disclaimer, the term of this patent is extended or adjusted under 35 U.S.C. 154(b) by 99 days.

(21) Appl. No.: 17/793,906

(22) PCT Filed: Jan. 20, 2021

(86) PCT No.: PCT/EP2021/051155
§ 371 (c)(1),
(2) Date: Jul. 19, 2022

(87) PCT Pub. No.: WO2021/148444
PCT Pub. Date: Jul. 29, 2021

(65) Prior Publication Data

US 2023/0051362 A1 Feb. 16, 2023

Related U.S. Application Data

(60) Provisional application No. 62/964,073, filed on Jan. 21, 2020.

(30) Foreign Application Priority Data

Apr. 2, 2020 (EP) .................................... 20167791

(51) Int. Cl.
*B05B 11/00* (2023.01)
*B05B 11/10* (2023.01)
*B05B 15/30* (2018.01)

(52) U.S. Cl.
CPC ...... *B05B 11/0054* (2013.01); *B05B 11/0081* (2013.01); *B05B 11/1047* (2023.01); *B05B 15/30* (2018.02)

(58) Field of Classification Search
CPC ............ B05B 11/0054; B05B 11/0081; B05B 11/1047; B05B 15/30; B05B 11/0038
See application file for complete search history.

(56) References Cited

U.S. PATENT DOCUMENTS

| | | | |
|---|---|---|---|
| D130,814 | S | 12/1941 | Comiskey et al. |
| D196,613 | S | 10/1963 | Platte |

(Continued)

FOREIGN PATENT DOCUMENTS

| | | |
|---|---|---|
| CN | 300717795 | 12/2007 |
| CN | 302252065 | 12/2012 |

(Continued)

OTHER PUBLICATIONS

Zevo Ant, Roach & Fly Instant Action Spray, Procter & Gamble, Mintel Record ID 8866383, Jul. 2021.

(Continued)

*Primary Examiner* — Vishal Pancholi
(74) *Attorney, Agent, or Firm* — Krista J. Aiello

(57) ABSTRACT

A refill cartridge and a bottle to contain the cartridge. The refill includes at least two sealed openings, one at the top and one at the bottom. They may be sealed by an in mold label. The bottle is suitable for including the cartridge and may also include a pump and a dip tube. The dip tube is used to pierce the top and bottom seals of the cartridge when the bottle closure is screwed onto the bottle. Piercing the bottom seal releases product into the water filled interior of the body of the bottle. Typically the product will be a concentrate such as a body wash or hand washing concentrate. The bottle preferably includes an aperture or window through which at (Continued)

least a portion of the cartridge can be seen so that the consumer can determine which variation of product is present in the refill in the bottle.

13 Claims, 16 Drawing Sheets

(56) References Cited

U.S. PATENT DOCUMENTS

| | | | | |
|---|---|---|---|---|
| 3,655,096 | A | 4/1972 | Easter | |
| D232,347 | S | 8/1974 | Macko | |
| D258,348 | S | 2/1981 | Hoyt | |
| D265,550 | S | 7/1982 | Young et al. | |
| D316,789 | S | 5/1991 | McLaughlin | |
| D330,677 | S | 11/1992 | Thornock et al. | |
| D345,299 | S | 3/1994 | Schmitt | |
| D351,991 | S | 11/1994 | Bertolini et al. | |
| D360,137 | S | 7/1995 | De Baschmakoff | |
| 5,529,216 | A | 6/1996 | Klima | |
| 5,836,479 | A | 11/1998 | Klima et al. | |
| 5,971,217 | A | 10/1999 | Visola | |
| 6,123,230 | A * | 9/2000 | Klima, Jr. | B05B 11/0056 222/129 |
| 6,223,945 | B1 * | 5/2001 | Giblin | B65D 23/10 220/62.22 |
| D443,202 | S | 6/2001 | Boussiquet et al. | |
| D452,788 | S | 1/2002 | Neiberger et al. | |
| D459,211 | S | 6/2002 | McGuinness | |
| D463,291 | S | 9/2002 | Kokubo et al. | |
| D463,973 | S | 10/2002 | Gobe | |
| D463,984 | S | 10/2002 | Kokubo et al. | |
| 6,460,701 | B1 | 10/2002 | Nytko | |
| D474,377 | S | 5/2003 | Holsinger | |
| D474,979 | S | 5/2003 | Leonidovych et al. | |
| D495,544 | S | 9/2004 | Tan | |
| D497,553 | S | 10/2004 | Mitchell | |
| D504,794 | S | 5/2005 | Sellars | |
| D510,589 | S | 10/2005 | Andre et al. | |
| D522,780 | S | 6/2006 | Sellars | |
| D523,668 | S | 6/2006 | Azrak | |
| D538,174 | S | 3/2007 | Isono et al. | |
| D541,159 | S | 4/2007 | Robinson | |
| D542,148 | S | 5/2007 | Boucher | |
| D551,560 | S | 9/2007 | De Baschmakoff | |
| D557,146 | S | 12/2007 | Penfold et al. | |
| D558,591 | S | 1/2008 | Blasko et al. | |
| 7,331,486 | B2 * | 2/2008 | Mon | B05B 11/0081 222/129 |
| D579,340 | S | 10/2008 | Dickman et al. | |
| D614,930 | S | 5/2010 | Garcia et al. | |
| D615,874 | S | 5/2010 | Nagata | |
| D616,233 | S | 5/2010 | Yang | |
| 8,157,131 | B2 * | 4/2012 | Sim | B65D 81/3222 222/129 |
| 8,302,816 | B2 * | 11/2012 | Sim | B05B 11/0056 222/129 |
| D682,709 | S | 5/2013 | Wang | |
| D699,111 | S | 2/2014 | Jeong | |
| D705,665 | S | 5/2014 | Shafer | |
| D707,562 | S | 6/2014 | Scales et al. | |
| 8,794,474 | B2 | 8/2014 | Mueller et al. | |
| D761,040 | S | 7/2016 | Barclay | |
| D777,036 | S | 1/2017 | Vizcarra et al. | |
| D786,085 | S | 5/2017 | Williams | |
| 9,751,667 | B2 | 9/2017 | Guery et al. | |
| D801,823 | S | 11/2017 | DeJonge et al. | |
| D807,663 | S | 1/2018 | Taylor | |
| D820,001 | S | 6/2018 | Cannamela et al. | |
| D1,004,441 | S | 11/2023 | Chung et al. | |
| D1,011,888 | S | 1/2024 | O'Toole et al. | |
| D1,011,920 | S | 1/2024 | Chung et al. | |
| D1,011,921 | S | 1/2024 | Chung et al. | |
| 2004/0124988 | A1 * | 7/2004 | Leonard | B05B 11/0054 340/612 |
| 2005/0224515 | A1 | 10/2005 | Mon | |
| 2006/0144855 | A1 | 7/2006 | Von Schuckmann | |
| 2013/0233889 | A1 * | 9/2013 | Stidham | A47K 5/12 206/457 |
| 2014/0190863 | A1 | 7/2014 | Fabozzi et al. | |
| 2015/0053721 | A1 | 2/2015 | Barclay | |
| 2016/0074889 | A1 | 3/2016 | Santagiuliana | |
| 2017/0014843 | A1 | 1/2017 | Richman et al. | |
| 2019/0270549 | A1 | 9/2019 | Chung | |
| 2023/0051362 | A1 | 2/2023 | Daigler et al. | |

FOREIGN PATENT DOCUMENTS

| | | | |
|---|---|---|---|
| CN | 304430632 | | 5/2017 |
| CN | 304576191 | | 4/2018 |
| CN | 305557757 | | 1/2020 |
| DK | 201670249 | | 4/2016 |
| EM | 001683343-0004 | | 1/2012 |
| EP | 2241515 | | 5/2013 |
| EP | 3431132 | | 1/2019 |
| EP | 3401074 | | 10/2019 |
| FR | 2927614 | | 8/2009 |
| GB | 2051396 | S | 10/1995 |
| JP | H0733868 | | 6/1995 |
| JP | 2001510127 | | 7/2001 |
| JP | 2003341698 | | 5/2002 |
| JP | 2014080236 | | 5/2014 |
| JP | 2015048087 | | 3/2015 |
| JP | 2020164228 | | 3/2019 |
| JP | 2020138772 | | 9/2020 |
| KR | 300991329 | | 1/2019 |
| WO | WO0243611 | | 6/2002 |
| WO | WO2018114301 | | 6/2018 |
| WO | WO2018119158 | | 6/2018 |
| WO | WO2018127847 | A1 | 7/2018 |

OTHER PUBLICATIONS

Search Report and Written Opinion in EP20167791; Sep. 7, 2020.

Search Report and Written Opinion in PCTEP2021051155; Apr. 30, 2021.

International Preliminary Report on Patentability in PCTEP2021051155; Dec. 13, 2021.

Plastic Foamng Pump Bottle, https://www.etsy.com/listing/1812052076/1-500pcs-20oz-60ml-matte-beige-color; Apr. 27, 2025.

* cited by examiner

BOTTLE AND REFILL

BACKGROUND OF THE INVENTION

Around the globe, there is increasing concern about the plastic waste which is generated in modern societies. Of particular concern is the pollution of our oceans with plastic containers and the like.

Many consumer products are sold in plastic packages which see a single use, after which they are discarded. One solution which has been proposed is the use of reusable shell packages for day-to-day enjoyment of the product and smaller refill packages for replenishing the product after it has been depleted. The advantage of this is that the larger, sturdier package is re-used whereas the packages which are used for replenishing the product time and again are smaller and sparing of plastic.

While there is increasing awareness of the problem of plastic waste, unfortunately that does not necessarily translate into acceptance of inconvenient products or packages. Thus, it is important that any refill which is to enjoy consumer acceptance must be easy and convenient to use. Also, the refill should work well and not result in a mess.

Prior refills have been proposed in the patent literature. These include those disclosed in Mueller et al. U.S. Pat. No. 8,794,474 Cesare et al. WO2018/114301 and Easter U.S. Pat. No. 3,655,096.

Easter discloses a container for diluting and dispensing materials in liquid form that comprises a primary vessel, e.g., a bottle, adapted to contain a diluent such as water and a replaceable cartridge mounted removably in the mouth of the bottle. The cartridge contains a relatively small amount of a chemical concentrate that is to be diluted. A dispensing mechanism composed of a pump with a bottle cap at its lower end is used to withdraw the contents of the container. A dip tube that extends downwards from the cap is introduced into the bottle by thrusting its free end through the top and bottom of the cartridge thereby perforating the same and allowing the material in the cartridge to drain into the bottle.

SUMMARY OF THE INVENTION

The present invention pertains to a refill cartridge, a bottle and combination bottle/cartridge which are easy to use and results in the use of less plastic. In accordance with a first embodiment, the invention comprises a cartridge suitable for use as a refill. The cartridge includes a body having a receptacle for receiving a product and a closure at its top, The closure includes a fastener for fastening the closure to the body, a closing platform including an opening, and a seal covering the opening. The seal is openable whereby to breach the seal and permit a pump dip tube to traverse the cartridge. The bottom of the cartridge likewise includes a sealed opening which can be breached by a dip tube, whereby to permit product to escape from the cartridge into the body of the bottle. It is particularly preferred that the seal comprises an in mold label.

The cartridge preferably includes a concentrated product which can be diluted with water in the bottle. Thus, the cartridge is smaller and contains less plastic than would be present in a full-sized one time-use bottle. Since it uses a modest amount of plastic, discarding or recycling the cartridge is an improvement over one-time use full sized packages.

Preferably, the above-described cartridge includes indicia visible from the outside of the cartridge. The indicia may be on one or more flaps extending downwardly from the top of the closure along at least part of a side of the cartridge. For example, there may be two opposing flaps comprising wings, one on each side of the cartridge.

In another embodiment, the invention is directed to a combined bottle and cartridge. The cartridge may, but need not be, the above described cartridge. The cartridge is received within the bottle and includes a closure at its top comprising at least one flap extending downwardly. An aperture or window is included in at least one of the bottle closure and bottle body. At least a portion of the flap is visible when the bottle closure is secured to the bottle. Thus, by placing indicia on the flap, such as a distinct color for each variant of product, it is possible for the consumer to see which variant is in the refill currently in the bottle.

In yet another embodiment, the invention includes a combined bottle and cartridge wherein the cartridge closure comprises a closing platform including an opening, and a seal covering the opening, the seal being openable when pierced by a dip tube. A seal on the bottom of the cartridge can be penetrated by the dip tube, which is preferably beveled, to permit fluid product to exit the cartridge. The container may include a pump attached to the dip tube.

The bottle/cartridge of the invention is particularly useful for concentrated products, such as body wash, wherein a concentrated body wash is contained within the refill and then diluted by combining with water in the body of the bottle. By use of a concentrate, less plastic is needed for the refill. The bottle, which accommodates the full volume of the diluted product, is reusable by the consumer. Thus, even if the bottle is made of plastic, plastic is conserved since the bottle is re-used. Still more preferably, the bottle is not made of plastic, e.g., is made of stainless steel or aluminum.

In another embodiment, the invention is directed to a bottle having an aperture or window suitable for viewing a cartridge therewithin. The bottle includes a closure and a body, and the aperture or window may be present in at least one of the closure and the body.

The invention is also directed to the process of using the cartridge and bottle to replenish and reuse the bottle.

For a more complete understanding of the above and other features and advantages of the invention, reference should be made to the following detailed description of preferred embodiments and to the accompanying drawings.

DETAILED DESCRIPTION OF THE INVENTION

Figure 1:
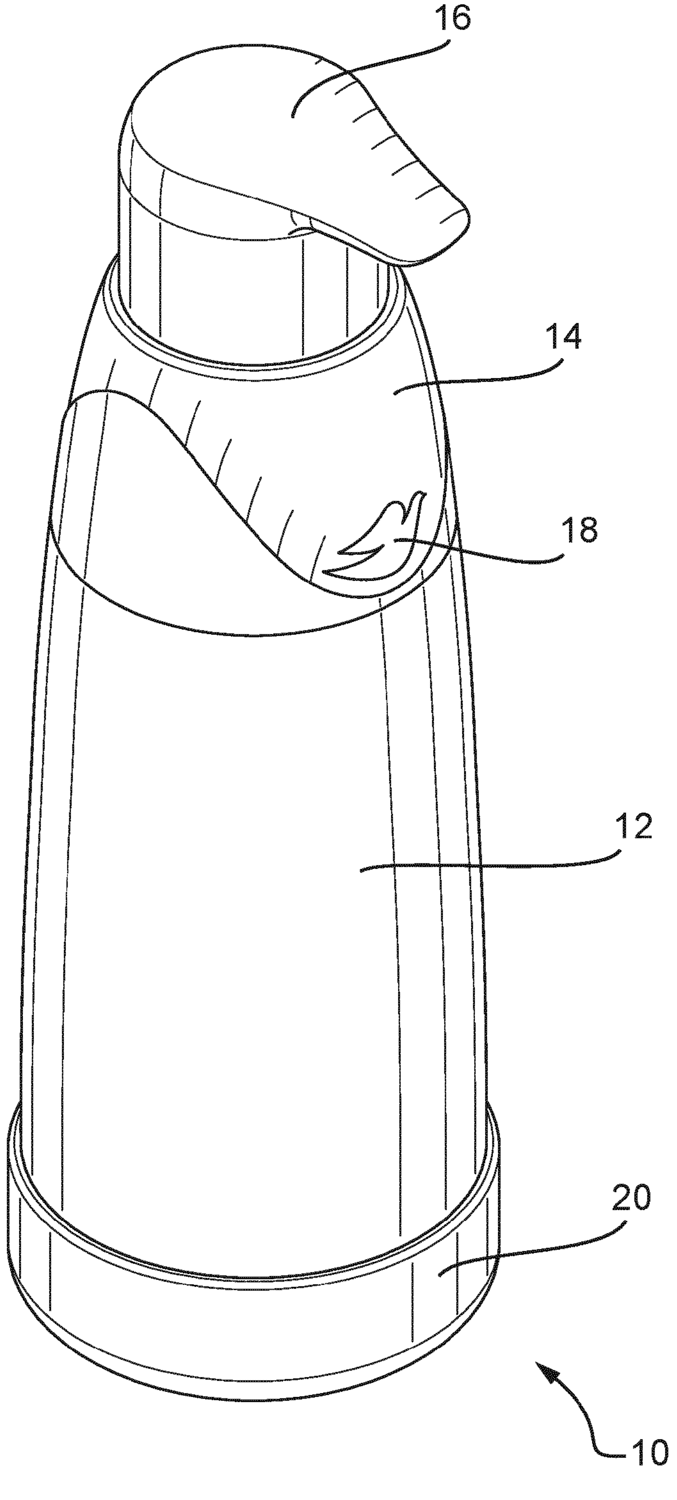
FIG. 1 is a perspective view of a bottle according to the invention.
Figure 2:
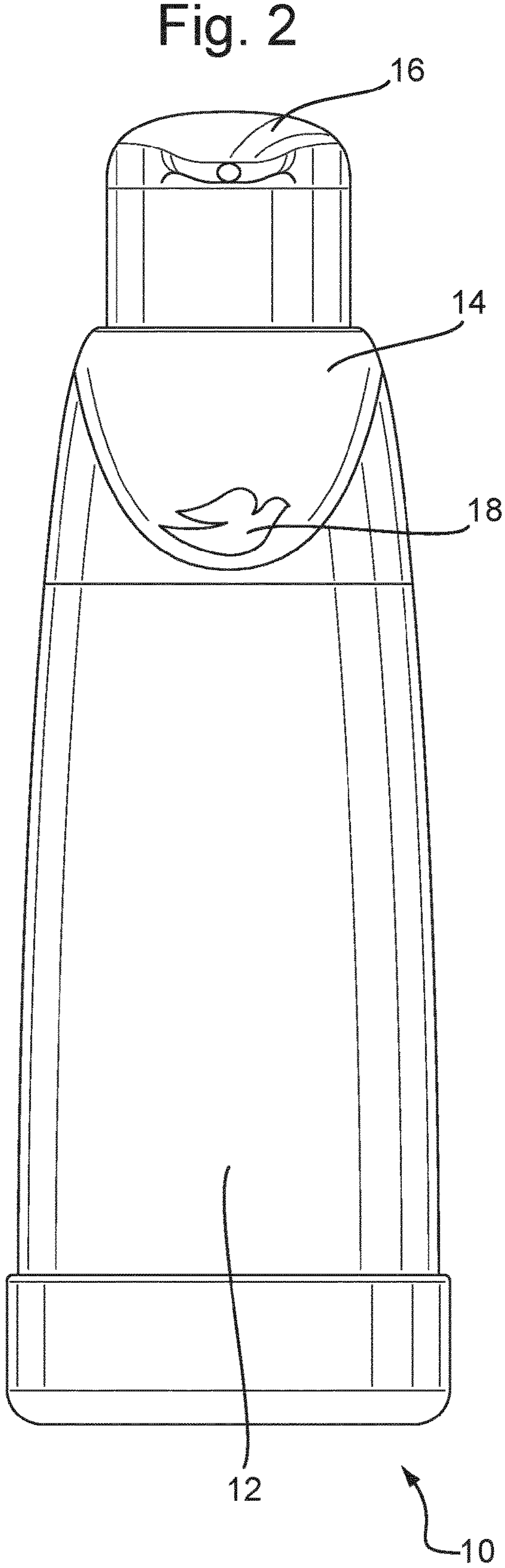
FIG. 2 is a front elevational view of the bottle of FIG. 1.
Figure 3:
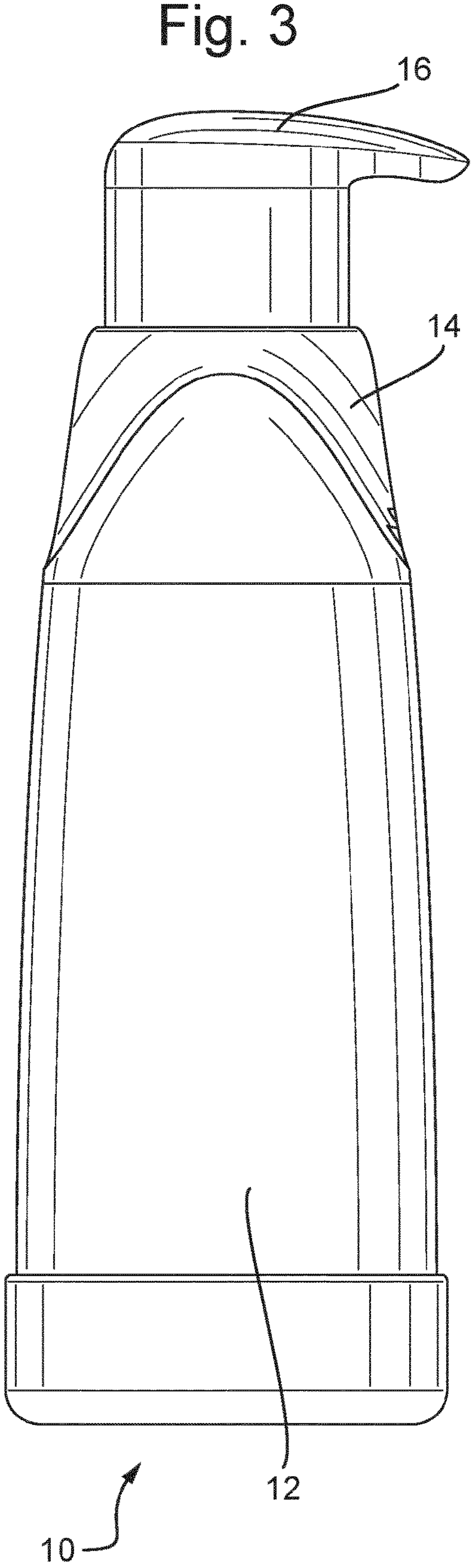
FIG. 3 is a side elevational view of the bottle of FIG. 1.
Figure 4:
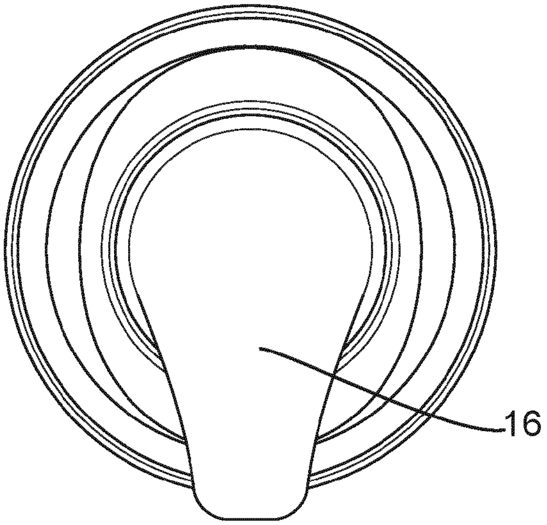
FIG. 4 is a top plan view of the bottle of FIG. 1.
Figure 5:
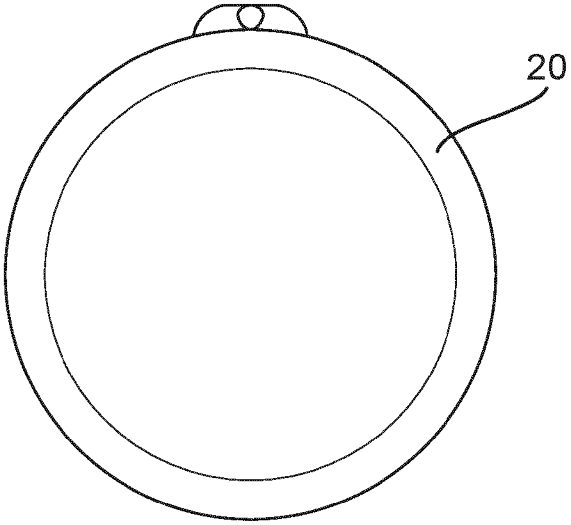
FIG. 5 is a bottom plan view of the bottle of FIG. 1.

Bottle 10 (FIGS. 1-4) includes body 12, closure 14 and pump head 16. An aperture or window 18 is disposed in closure 14, as will be discussed hereinafter. Body 12 is received in bottom sleeve 20. Sleeve 20 protects the bottom of the bottle from damage such as scuffs, scrapes and denting. It may be made of silicone. The bottle may be made of suitable plastic such as high density polyethylene, although to minimize plastic use it may advantageously be fabricated from stainless steel or aluminum. The pump and bottle closure may be made of high density polyethylene. Other materials of which the bottle could be made include glass and polyethylene terephthalate.

Figure 12:
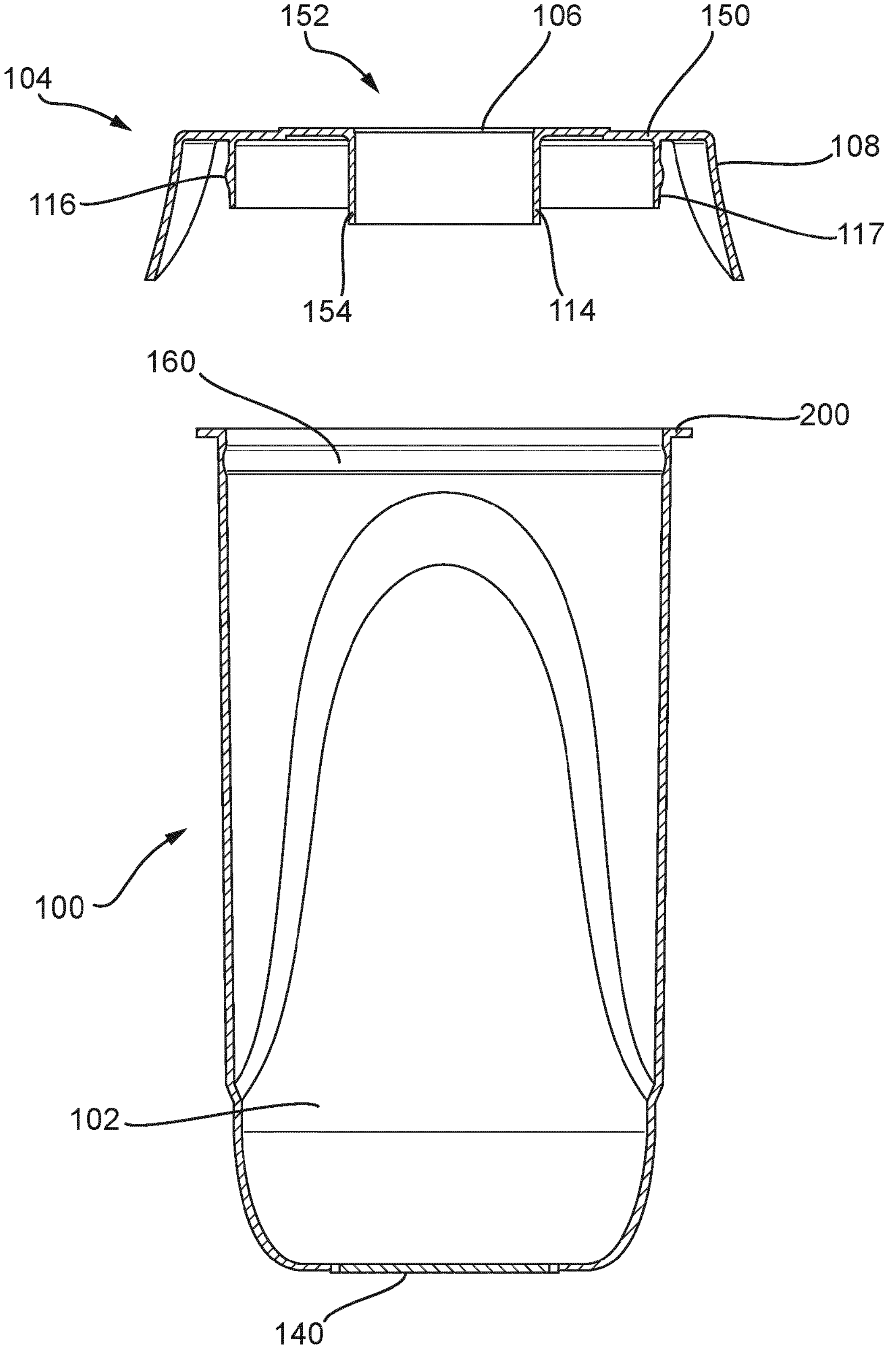
FIGS. 12-15 are partial cross sectional views of the cartridge of the invention prior to application of its closure from various angles.
Figure 13:
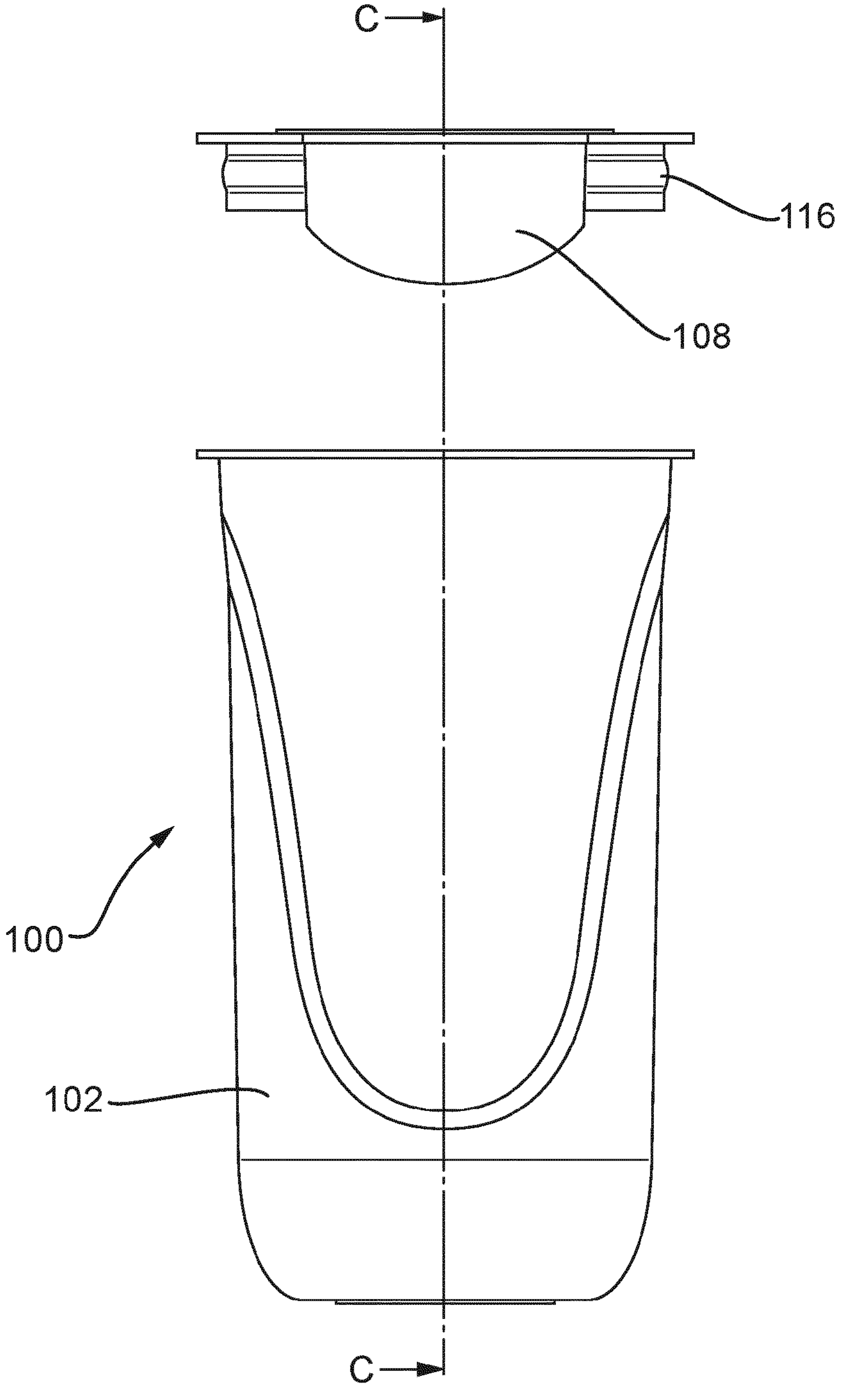
Figure 14:
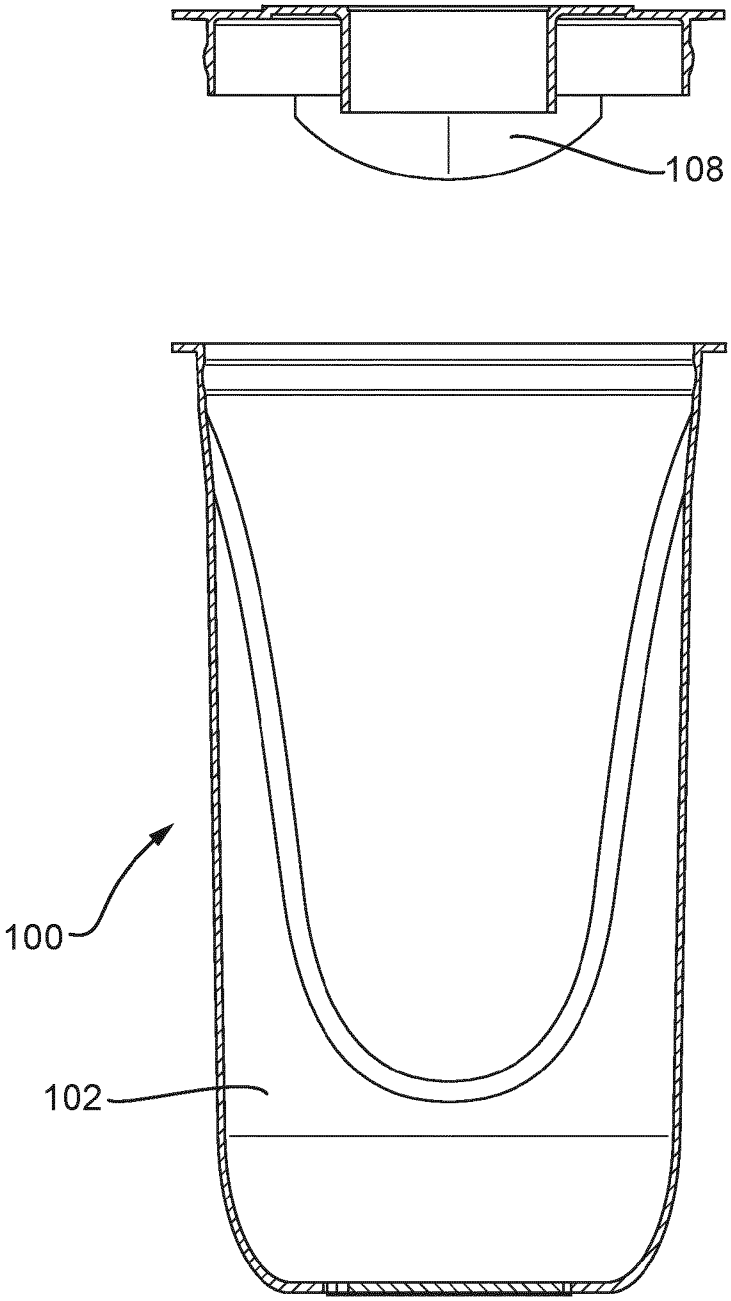
Figure 15:
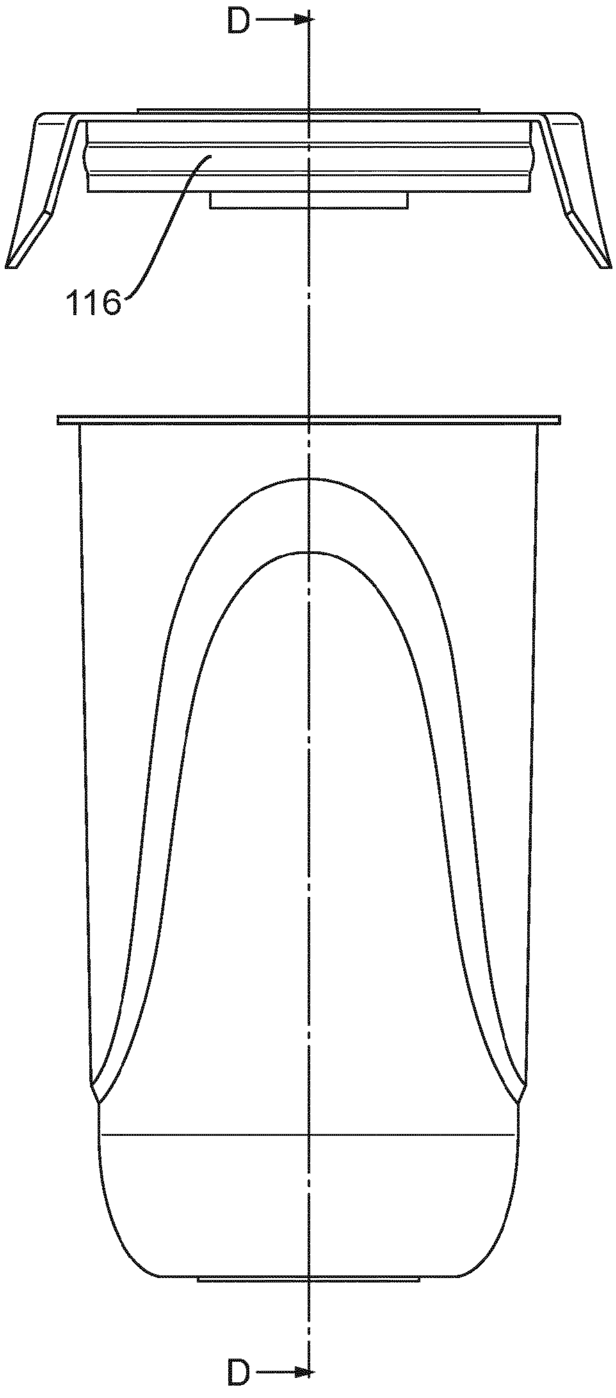

Cartridge 100 (FIGS. 7-15) comprises body 102 and closure 104. Closure 104 includes opposed flaps 108 depending therefrom. Closure 104 includes closing platform 150 and an opening 152 defined by an inner cylindrical wall 154 (see e.g., FIG. 12) and sealed by in mold label (IML) seal 106. Outer cylindrical wall 117 having external protuberances 116 depends from platform 150. The cartridge may be made of high density polyethylene, and the IML may also be made of high density polyethylene. The IML must be made of a material which can be opened by the dip tube, with or without door 170. Other materials such as polypropylene may be suitable for the IML, depending on the barrier properties desired. The IML could also be multilayer of the same or different materials.

In general, product will be placed in the body of the cartridge by the manufacturer, who will secure the cartridge closure 150 to the cartridge, as by screwing or snapping them together. In the embodiment shown in FIG. 12 depending wall 117 has external protuberances 116 which are snapped into internal detents 160 inside the upper end of the body of the cartridge to secure the cartridge closure to the cartridge. Of course, other structures may be used to secure the cartridge closure to the cartridge. Flaps 108 extend downwardly along the outside of the cartridge from the top of the closure.

Figure 16:
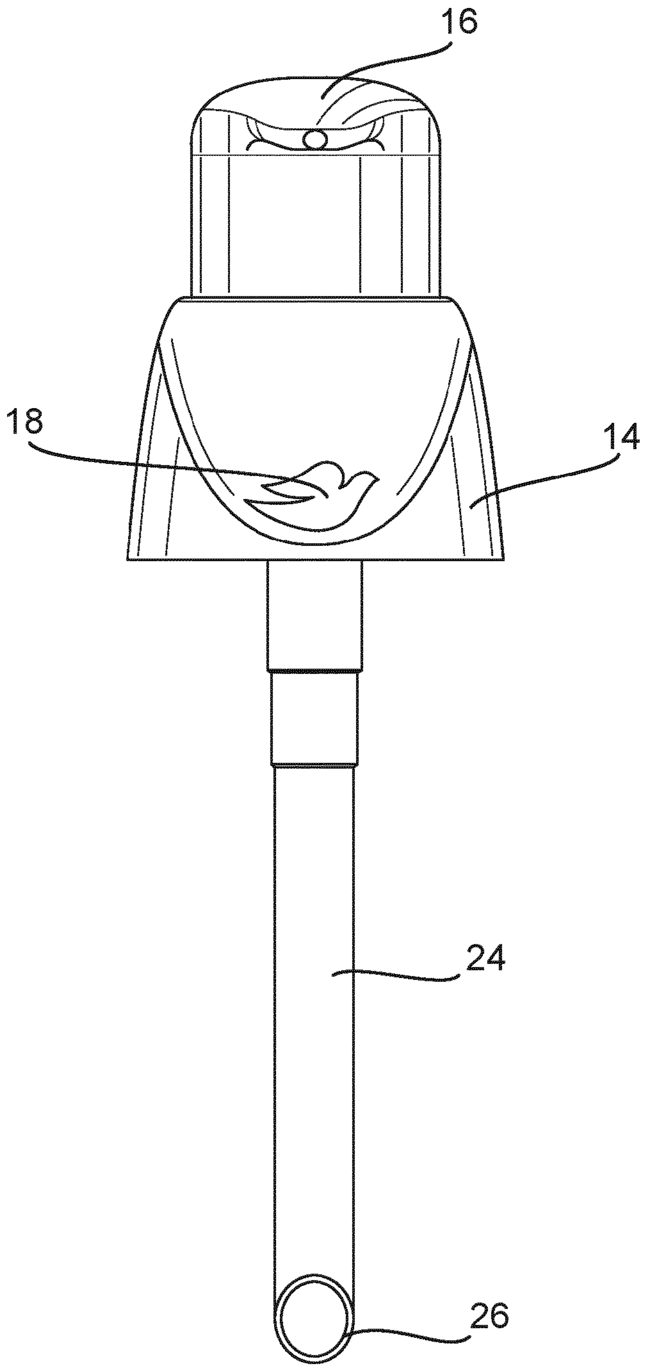
FIG. 16 is a front elevational view of the pump and closure of the bottle of FIG. 1, together with a dip tube.
Figure 17:
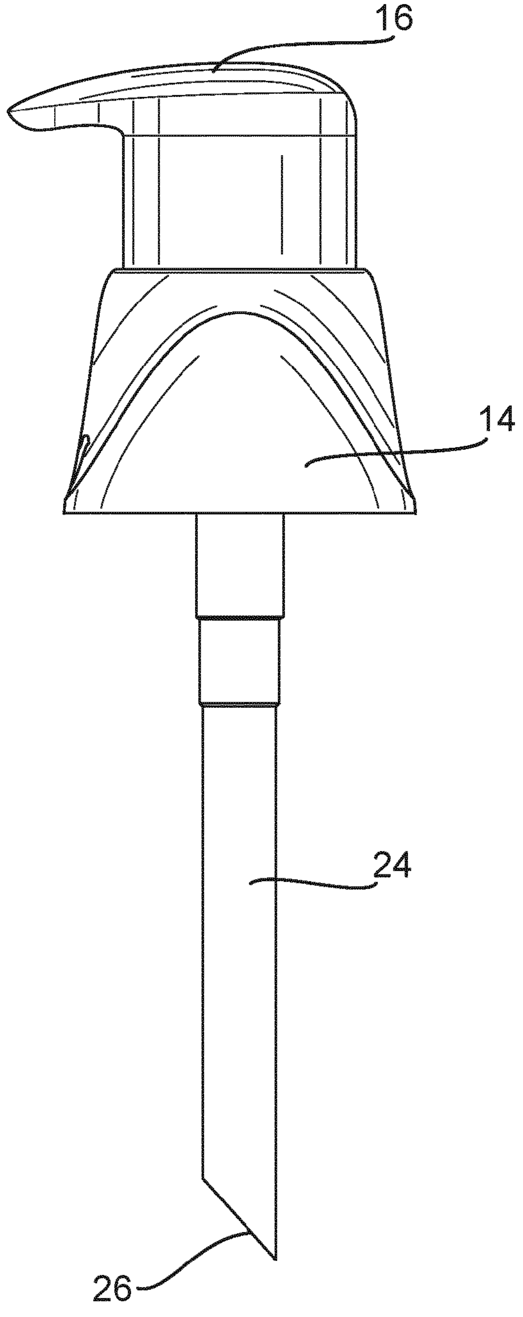
FIG. 17 is a side elevational view of the pump, closure and dip tube of FIG. 16.
Figure 18:
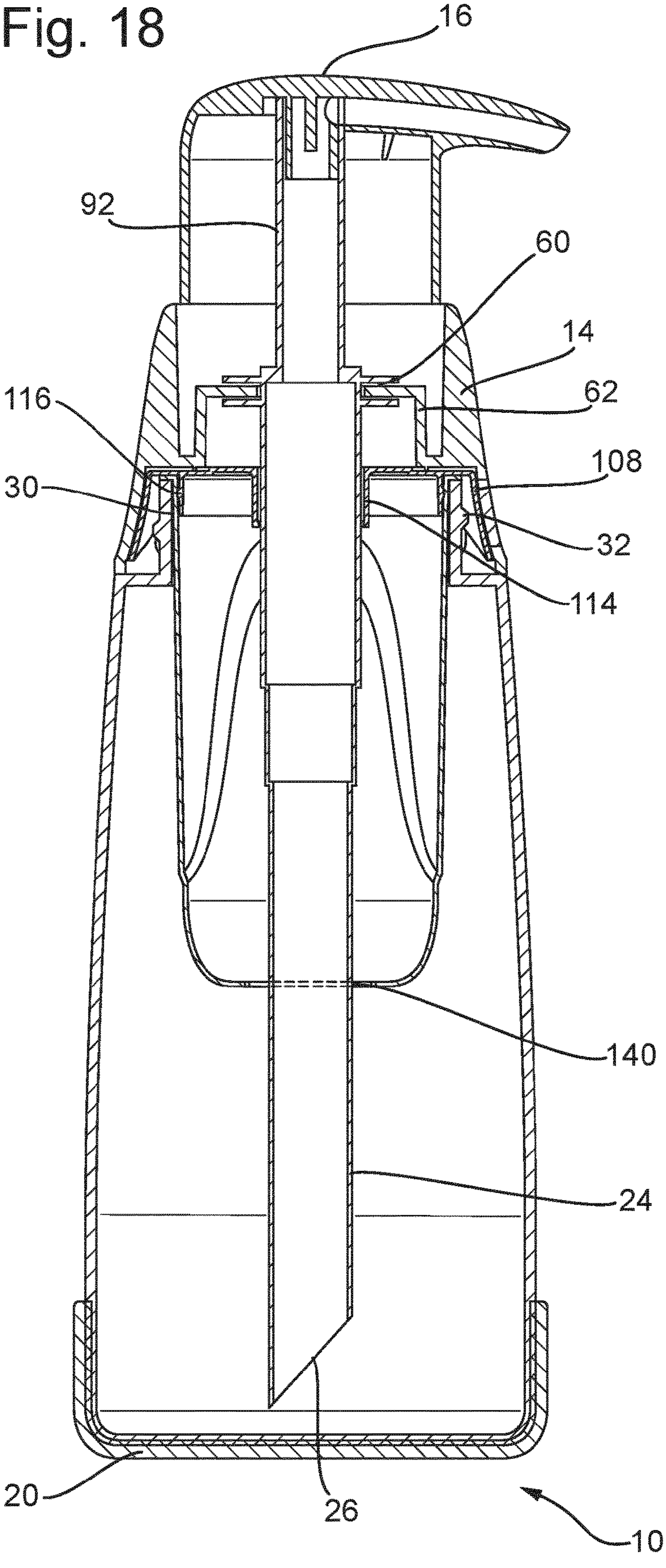
FIG. 18 is a partial cross section of the bottle of FIG. 3.

Preferably, the manufacturer will provide the bottle to the consumer with pump, bottle closure and dip tube attached as shown in FIGS. 16 and 17. As best seen in FIG. 18, support prong 62 within bottle closure 14 is accommodated within clips 62 on the pump stem 92 to help secure the pump in the closure. The pump may be secured within the bottle structure using ribs, gaskets, or plastic.

The bottle may be provided with a first cartridge already in place, or the bottle may be empty of a cartridge. Assuming there is no cartridge in the bottle, or the cartridge is spent and has been removed, when ready to use the product, the consumer will remove the closure/pump/dip tube from the bottle and place water within the body of the bottle. Then the consumer inserts the cartridge into the bottle with ledge 200 (FIG. 12) of the cartridge resting on bottle neck 30. Flaps 108 extend downwardly from closure 104 on the outside of the neck 30.

The combined bottle closure/pump head/dip tube shown in FIGS. 16 and 17 are then put in place. Closure 14 is screwed onto the bottle with external screws 32 on the bottle neck mating with internal screws 90 on the bottle closure (see FIG. 19). This secures the cartridge within the bottle. Dip tube 24 is beveled at 26 to facilitate penetration of seal 106 (FIG. 12) to permit the dip tube to enter into the cartridge through the opening 152 in the closure of the cartridge and then to push open door 170 in the bottom of the cartridge which then pushes open seal 140 beneath the cartridge to permit product to escape from the cartridge into the water-filled body 12 of the bottle. Door 170 is formed from a generally circular cut 171 in bottom 172 of the cartridge and preferably remains attached to bottom 172 at least at one point 174 which serves as a hinge. While the door 170 is illustrated as generally circular it may be of an suitable shape.

Figure 19:
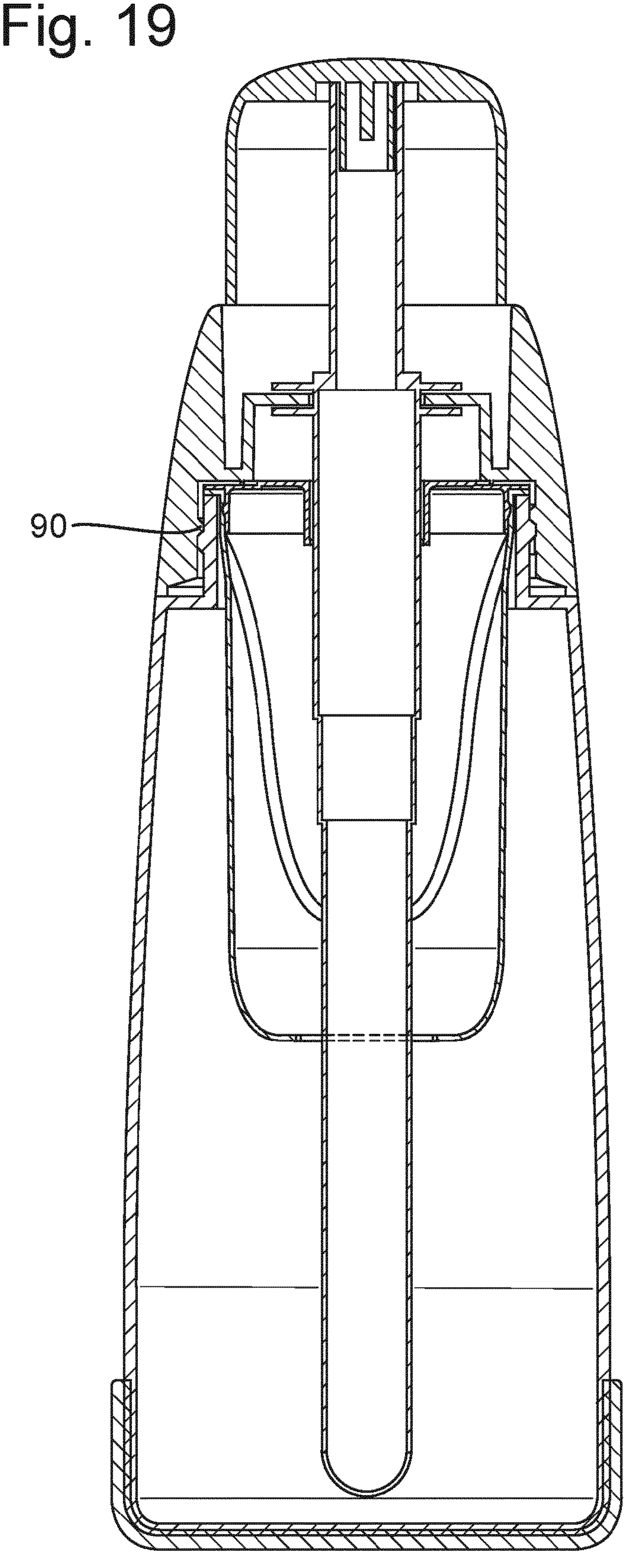
FIG. 19 is a partial cross section from the bottle of FIG. 2.
Figure 20:
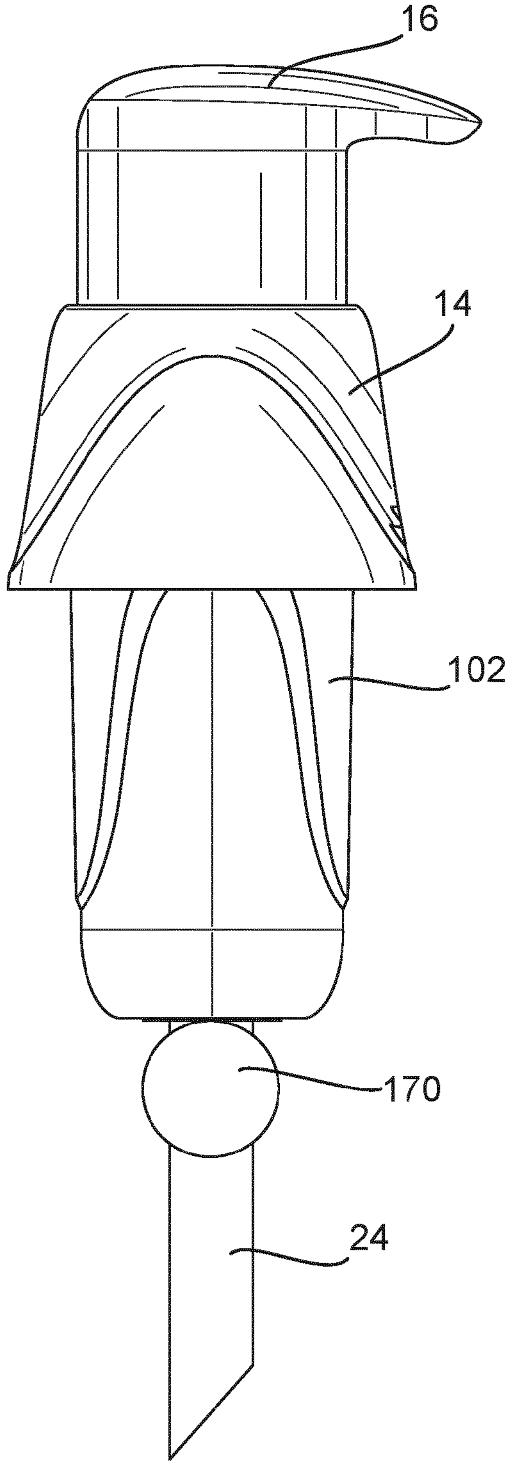
FIG. 20 is an elevation of FIG. 3 with the bottle removed and showing the door.
Figure 21:
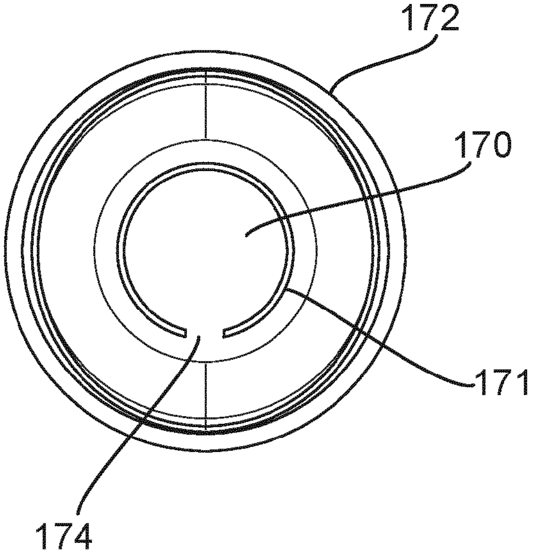
FIG. 21 is a top plan view of the cartridge of FIG. 9 but without the closure.

FIGS. 18 and 19 show the structure of the bottle/cartridge combination once the bottle closure has been closed and the dip tube has been inserted through the cartridge to the bottom of the bottle, except that the door 170 is omitted.

Figure 6:
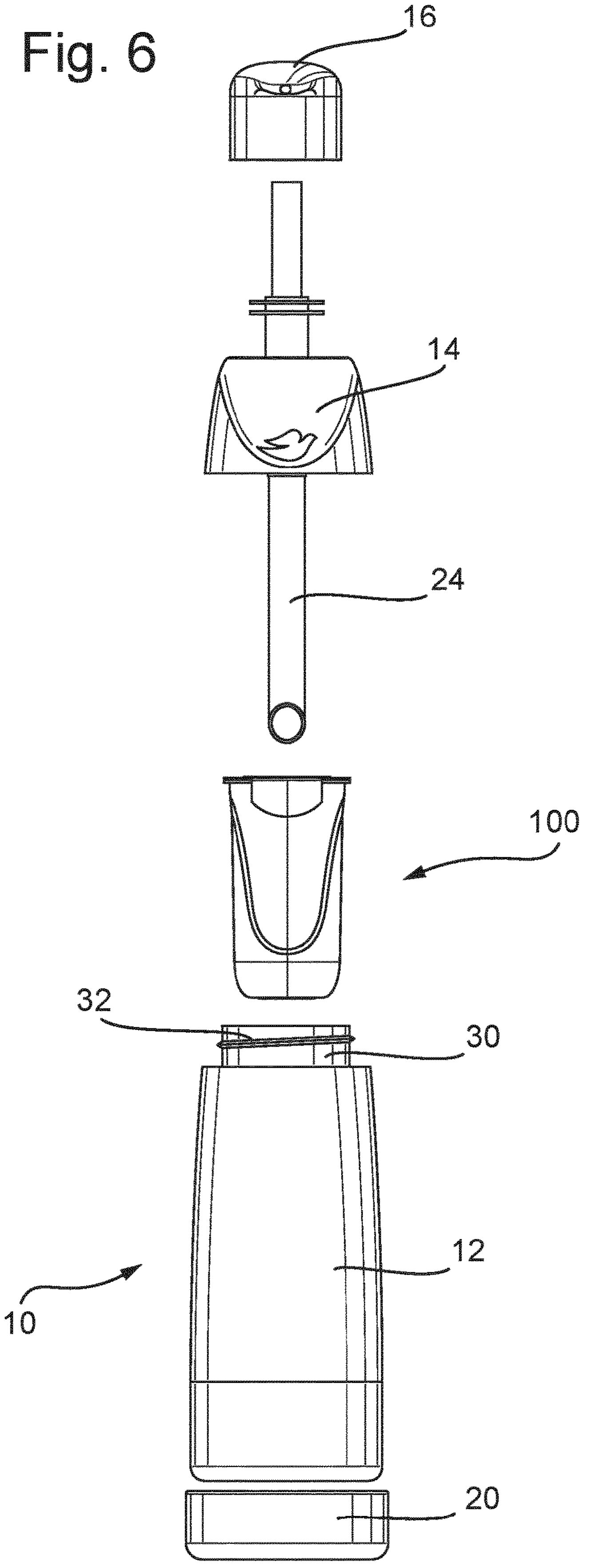
FIG. 6 is an exploded view showing the bottle prior to insertion of a refill cartridge and closing with its cover.
Figure 7:
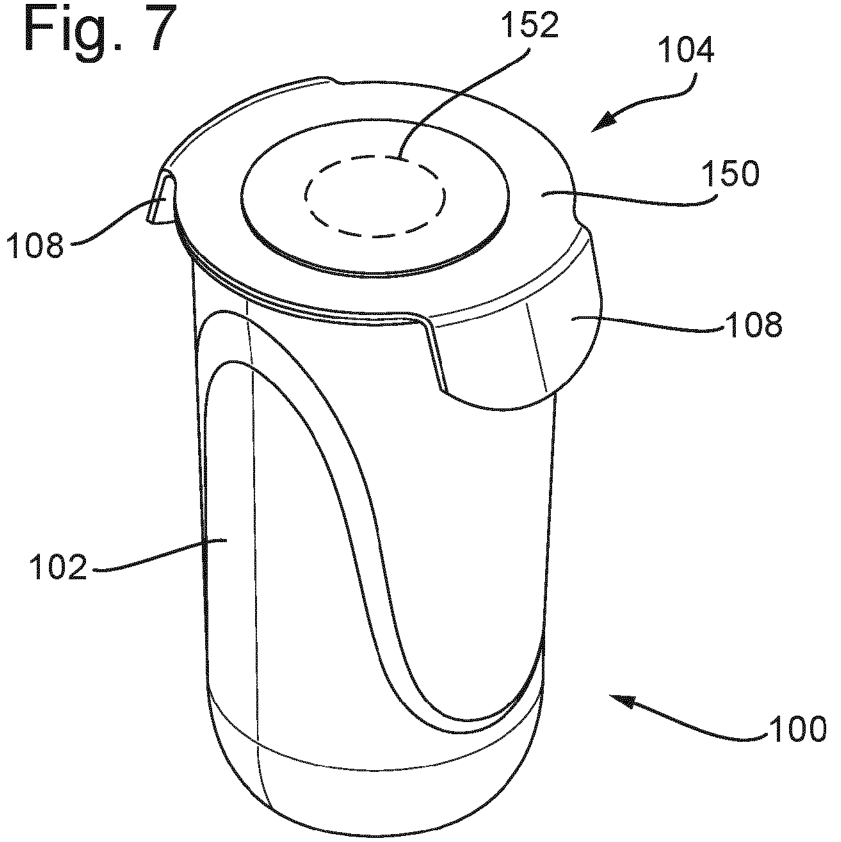
FIG. 7 is a perspective view of a cartridge according to the invention.
Figure 8:
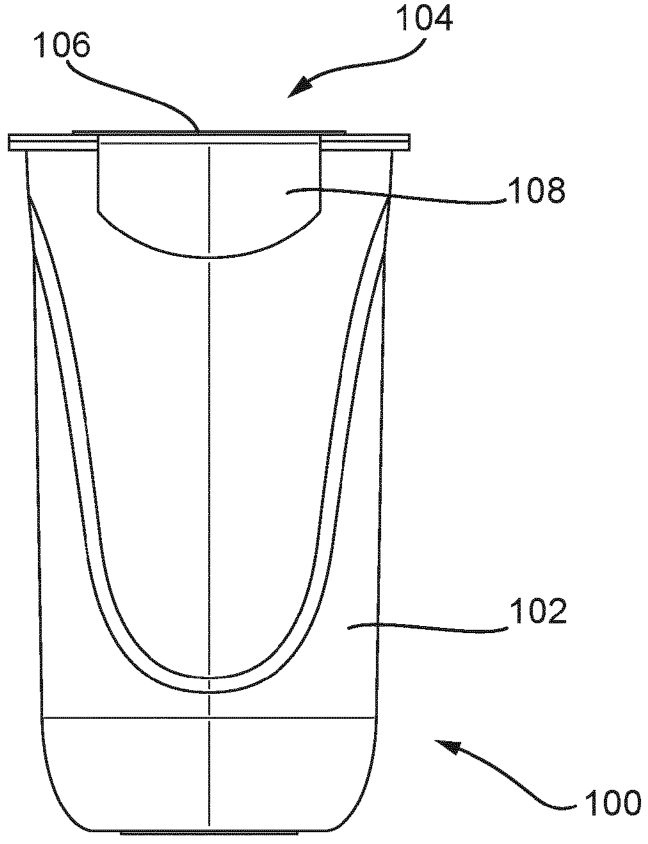
FIG. 8 is a front elevational view of the cartridge of FIG. 7.
Figure 9:
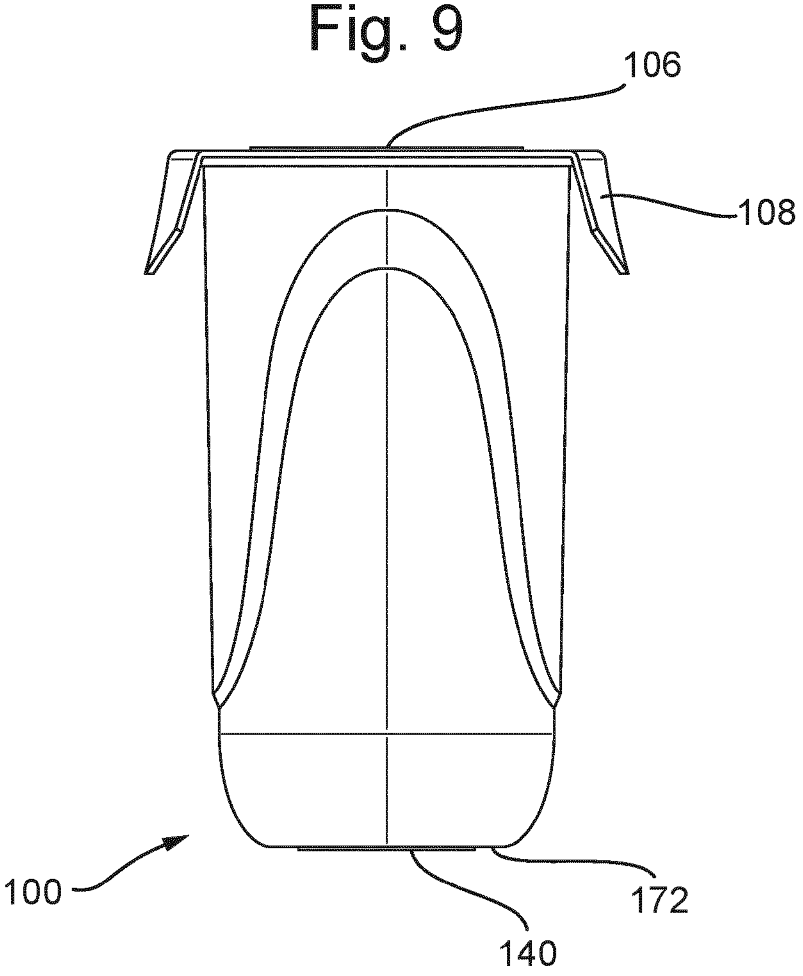
FIG. 9 is a side elevational view of the cartridge of FIG. 7.
Figure 10:
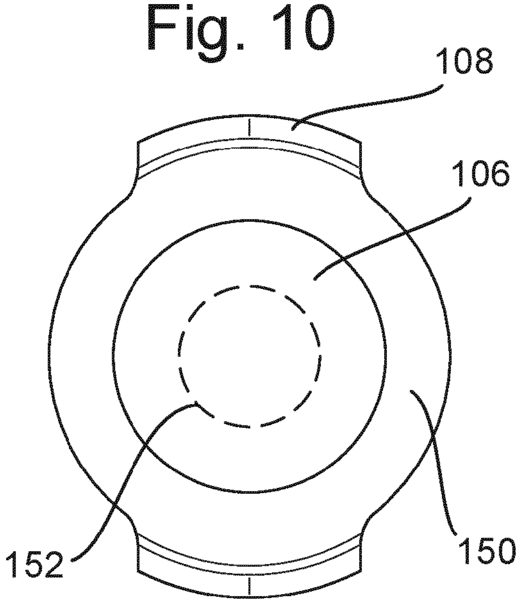
FIG. 10 is a top plan view of the cartridge of FIG. 7.
Figure 11:
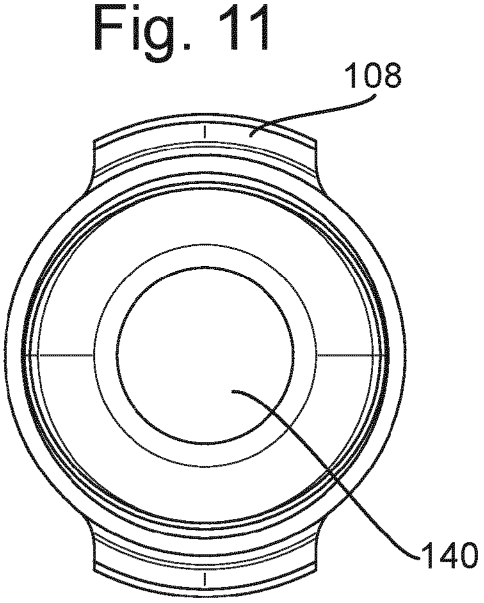
FIG. 11 is a bottom plan view of the cartridge of FIG. 7.

The relationships among the components of the bottle/refill can be seen in FIG. 6.

Once the cartridge/refill, pump and bottle closure are in place as seen in FIG. 18, the consumer presses on the pump head to pump the diluted product from the body of the bottle. When the product is depleted, the consumer readily opens the bottle by unscrewing the closure and can then remove pump head/closure/dip tube from the refill the and the refill from the bottle body. The refill can be discarded, or more preferably, recycled, and another one inserted.

When the bottle closure 14 is screwed onto the bottle, flaps 108 are received beneath the bottle closure, between the closure wall and the neck 30 of the bottle. In accordance with one feature of the invention, aperture or window 18 in the bottle closure is positioned so that when the closure is closed, the aperture will permit viewing of all or part of one or more of the flaps 108. If a window is used instead of an aperture, it may be a transparent or translucent plastic. Thus, the consumer can see part of the flap even though the bottle is closed. This permits the consumer to know which refill is present in the bottle if appropriate indicia such as color are present on the flaps. Alternatively, the one or more apertures or windows can be placed in the body of the bottle in addition, or instead of, the one in the closure, as long as a part of the cartridge will be visible from outside the bottle.

While the cartridge has been illustrated as having a sealed opening at the top and a sealed door at the bottom, other arrangements permitting insertion of a dip tube through the top and bottom may be possible. For instance, one or both may have a closure such as a flip top, which could be opened by consumers prior to insertion of the cartridge into the bottle. Thus, the cartridge will have a closed area at its top which will accommodate passing through of a dip tube, either through lines of weakness, which may be sealed, or sealed opening or reversible opening, and a closed area at the bottom which will a dip tube can open either through a cut or lines of weakness, which may be sealed, or sealed opening or reversible opening.

Suitable pumps may be obtained from Rieke Corp. of Auburn, Indiana. Suitable stainless steel bottles may be obtained from S'well Bottles of New York, NY. Suitable in mold labels may be obtained from CCL Industries of Shelton, CT.

Among the aspects of the invention, are the following:

1. A cartridge comprising
   a) A body including a receptacle for receiving a product,
   b) A closure at its top, and
   c) A seal at its bottom
   d) the closure comprising
      i) a closing platform including an opening
      ii) a closure seal covering the opening of the closure,
      iii) the closure seal being openable to break the seal and permit a dip tube to penetrate the top of the cartridge, the bottom seal upon opening by the dip tube releasing product into the bottle.
2. The cartridge according to claim 1 further comprising indicia visible from the outside of the cartridge.
3. The cartridge according to claim 2 wherein the indicia is visible from a side of the cartridge.
4. The cartridge according to claim 2 wherein the closure further comprises at least one flap extending downwardly from the top of the closure along at least part of a side of the cartridge.
5. The cartridge according to claim 2 wherein the closure comprises two opposing flaps comprising wings, one on each side of the cartridge.
6. The cartridge according to claim 1 wherein at least one of the closure seal and the seal at the bottom of the cartridge comprises an in mold label.
7. The cartridge according to claim 1 wherein the in mold label comprises high density polyethylene,
8. A cartridge comprising
   a) A body including a receptacle for receiving a fluid product,
   b) A closure at its top,
   c) the closure comprising
   d) at least one flap extending downwardly from the top of the closure along at least part of a side of the cartridge.
9. A combined bottle and cartridge comprising:
   a. a bottle including a bottle closure and a bottle body,
   b. The bottle body including a receptacle for a cartridge,
   c. A cartridge comprising
      i. A cartridge body including a cartridge receptacle for receiving a fluid product,
      ii. A cartridge closure at its top,
      iii. the closure comprising at least one flap extending downwardly from the top of the closure.
   d. The cartridge being received within the bottle,
   e. An aperture or window in at least one of the bottle closure and bottle body through which at least a portion of the flap is visible when the bottle closure is secured to the bottle.
10. The combined bottle and cartridge according to claim 9 wherein the bottle comprises a neck above the bottle body and the flap extends downwardly adjacent the neck, and wherein the aperture or window through which the flap is visible is in the bottle closure whereby when the bottle closure is closed at least a portion of the flap is visible through the aperture or window.
11. A combined bottle and cartridge comprising:
   a. a bottle including a bottle closure and a bottle body,
   b. The bottle body including a receptacle for a cartridge,
   c. A cartridge comprising
      i. A cartridge body including a cartridge receptacle for receiving a fluid product,
      ii. A cartridge closure at its top,
      iii. the closure comprising at least one flap extending downwardly from the top of the closure,
      iv. the cartridge including a seal at its bottom,
   d. the cartridge closure comprising
      i. a closing platform including an opening
      ii. ii. a seal covering the opening,
      iii. the seal being openable to break the seal when contacted by a dip tube, the bottom seal permitting fluid product to exit the cartridge when the bottom seal is opened by the dip tube.
12. The combined bottle and cartridge of claim 11 further comprising a pump received within the bottle closure and a dip tube extending downwardly from the pump, the dip tube having an upper end adjacent the pump and a lower end.
13. The combined bottle and cartridge of claim 12 wherein the dip tube includes a bevel at its lower end for piercing the seal.
14. A bottle comprising:
   a. a bottle closure and a bottle body,
   b. The bottle body including a receptacle suitable for containing for a cartridge,
   c. An aperture or window in at least one of the bottle closure and bottle body which is suitable for viewing at least part of the cartridge from the outside of the bottle.
15. The bottle according to claim 14 further comprising a pump received within the bottle closure.
16. The cartridge according to claim 1 wherein the bottom includes a door, the door is sealed by the seal and the door is openable when contacted with the dip tube to open the seal.
17. The cartridge according to claim 16 wherein the door is formed in the bottom of the cartridge by a cut and is attached to the bottom at a hinge.
18. A cartridge comprising a top having an opening to receive a dip tube, and a bottom having an opening to receive a dip tube, the top and bottom openings being reversibly closed by a closure.
19. A cartridge comprising a top having an opening or lines of weakness and a bottom having an opening or lines of weakness, the opening or lines of weakness being suitable to permit a dip tube to penetrate said cartridge top and open said cartridge bottom.
20. The combined bottle and cartridge of claim 9 wherein the cartridge includes a ledge at its periphery at its top and the cartridge is received within the bottle with the ledge resting on the bottle.
21. The cartridge according to claim 11 wherein the bottom includes a door, the door is sealed by the seal and the door is openable when contacted with the dip tube to open the seal.
22. The cartridge according to claim 21 wherein the door is formed in the bottom of the cartridge by a cut and is attached to the bottom at a hinge.
23. The combined bottle and cartridge of claim 11 wherein the cartridge includes a ledge at its periphery at its top and the cartridge is received within the bottle with the ledge resting on the bottle.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

The invention claimed is:

1. A cartridge (100) comprising a) a body (102) including a receptacle for receiving a product, and b) a top having a closure (104), the improvement wherein the closure (104) includes i) a closure platform (150) having an opening (152) including a closure seal (106) covering the opening, or ii) lines of weakness, and wherein a cartridge bottom (172) has i) an opening with a bottom seal (140) or ii) lines of weakness, the opening with seal or lines of weakness being suitable to permit a dip tube (24) to penetrate said cartridge top and open said cartridge bottom wherein at least the closure seal (106) comprises a label, wherein the closure (104) comprises two opposing flaps (108) comprising wings, one on each side of the cartridge (100).

2. The cartridge (100) according to claim 1 further comprising indicia visible from the outside of the cartridge.

3. The cartridge according to claim 1 wherein the label comprises high density polyethylene.

4. The cartridge according to claim 1 wherein he closure seal (106) and the bottom seal (140) comprise a label.

5. The cartridge (100) according to claim 1, wherein the cartridge bottom includes a door (170), the door is sealed by the seal and the door is openable when contacted with the dip tube (24) to open the seal.

6. The cartridge (100) according to claim 5, wherein the door (170) is formed in the bottom of the cartridge by a cut (171) and is attached to the bottom at a hinge (174).

7. A cartridge (100) according to claim 1 combined with a bottle (10), the cartridge closure (104) comprising at least one flap (108) extending downwardly from the top of the closure (104), the cartridge (100) being received within the bottle (10), an aperture or window (18) in at least one of a bottle closure (14) and a bottle body through which at least a portion of the flap (108) is visible when the bottle closure (14) is secured to the bottle (10).

8. The combined bottle (10) and cartridge (100) according to claim 7, wherein the bottle (10) comprises a neck above the bottle body and the flap (108) extends downwardly adjacent the neck, and wherein the aperture or window (18) through which the flap (108) is visible is in the bottle closure whereby when the bottle closure is closed at least a portion of the flap (108) is visible through the aperture or window (18).

9. The combined bottle (10) and cartridge (100) of claim 7, further comprising a pump received within the bottle closure and a dip tube (24) extending downwardly from the pump, the dip tube (24) having an upper end adjacent the pump and a lower end.

10. The combined bottle (10) and cartridge (100) of claim 9, wherein the dip tube (24) includes a bevel (26) at its lower end for piercing the seal.

11. The combined bottle (10) and cartridge (100) according to claim 7, wherein the bottle body includes a receptacle suitable for containing the cartridge (100).

12. The combined bottle (10) and cartridge (100) according to claim 7, further comprising a pump received within the bottle closure (14).

13. The cartridge according to claim 1 wherein the label comprises an in-mold label.

* * * * *